(12) United States Patent
Sudarshan et al.

(10) Patent No.: US 8,799,044 B2
(45) Date of Patent: Aug. 5, 2014

(54) SYSTEM AND METHOD FOR CUSTOMIZING PRODUCT LIFECYCLE MANAGEMENT PROCESS TO IMPROVE PRODUCT EFFECTIVENESS

(75) Inventors: Donekal Radhakrishna Rao Sudarshan, Bangalore (IN); Jeff Kavanaugh, Colleyville, TX (US)

(73) Assignee: Infosys Limited (IN)

( * ) Notice: Subject to any disclaimer, the term of this patent is extended or adjusted under 35 U.S.C. 154(b) by 697 days.

(21) Appl. No.: 12/685,942

(22) Filed: Jan. 12, 2010

(65) Prior Publication Data

US 2010/0191579 A1 Jul. 29, 2010

(30) Foreign Application Priority Data

Jan. 23, 2009 (IN) .............................. 157/CHE/2009

(51) Int. Cl.
| | |
|---|---|
| *G06Q 10/00* | (2012.01) |
| *G06Q 10/06* | (2012.01) |
| *G06Q 30/02* | (2012.01) |
| *G06F 1/00* | (2006.01) |

(52) U.S. Cl.
CPC .... *G06Q 10/06375* (2013.01); *G06Q 10/06395* (2013.01); *G06Q 30/0201* (2013.01); *G06F 1/00* (2013.01)
USPC ......... 705/7.14; 705/7.39; 705/7.29; 717/101

(58) Field of Classification Search
None
See application file for complete search history.

(56) References Cited

U.S. PATENT DOCUMENTS

| | | | |
|---|---|---|---|
| 6,038,517 A | 3/2000 | Dobbins et al. | |
| 6,161,113 A * | 12/2000 | Mora et al. | 715/234 |
| 7,103,434 B2 * | 9/2006 | Chernyak et al. | 700/98 |
| 7,752,070 B2 * | 7/2010 | Hatcher et al. | 705/7.38 |
| 7,761,316 B2 * | 7/2010 | Ligon et al. | 705/7.29 |
| 7,899,922 B2 * | 3/2011 | Dornbach et al. | 709/230 |
| 7,971,180 B2 * | 6/2011 | Kreamer et al. | 717/101 |
| 8,006,223 B2 * | 8/2011 | Boulineau et al. | 717/101 |
| 8,032,404 B2 * | 10/2011 | Lee et al. | 705/7.17 |
| 8,050,962 B2 * | 11/2011 | Worcester | 705/7.39 |
| 8,200,527 B1 * | 6/2012 | Thompson et al. | 705/7.39 |
| 8,214,238 B1 * | 7/2012 | Fairfield et al. | 705/7.11 |
| 8,301,420 B2 * | 10/2012 | Rollmann et al. | 703/1 |
| 8,311,863 B1 * | 11/2012 | Kemp | 705/7.11 |
| 2002/0052862 A1 * | 5/2002 | Scott et al. | 707/1 |
| 2002/0055832 A1 | 5/2002 | Donelan et al. | |
| 2002/0178044 A1 | 11/2002 | Bicknell et al. | |
| 2003/0033191 A1 * | 2/2003 | Davies et al. | 705/10 |
| 2004/0181417 A1 * | 9/2004 | Piller et al. | 705/1 |
| 2005/0027550 A1 * | 2/2005 | Pritchard et al. | 705/1 |
| 2005/0080502 A1 * | 4/2005 | Chernyak et al. | 700/97 |
| 2005/0203786 A1 | 9/2005 | Jessup et al. | |

(Continued)

OTHER PUBLICATIONS

Dooley; Maturity and New Product Development; (2001).*

(Continued)

*Primary Examiner* — Gurkanwaljit Singh
(74) *Attorney, Agent, or Firm* — Lerner, David, Littenberg, Krumholz & Mentlik, LLP

(57) ABSTRACT

A method for improving product effectiveness of a New Product Development (NPD) process by customizing a Product Lifecycle Management (PLM) of an organization is provided. The method comprises diagnosing current status of the organization with respect to one or more product effectiveness parameters. The method further comprises generating a set of initiatives for the organization based on diagnosis. The method furthermore comprises customizing the PLM using one or more solution accelerators corresponding to one or more initiatives.

16 Claims, 8 Drawing Sheets

(56) References Cited

U.S. PATENT DOCUMENTS

| | | | |
|---|---|---|---|
| 2007/0106708 A1* | 5/2007 | Rigg et al. | 707/203 |
| 2007/0150293 A1* | 6/2007 | Dagnino | 705/1 |
| 2007/0192170 A1 | 8/2007 | Cristol | |
| 2007/0203912 A1* | 8/2007 | Thuve et al. | 707/10 |
| 2008/0306798 A1* | 12/2008 | Anke et al. | 705/8 |
| 2008/0312979 A1* | 12/2008 | Lee et al. | 705/7 |
| 2008/0312980 A1* | 12/2008 | Boulineau et al. | 705/7 |
| 2008/0313008 A1* | 12/2008 | Lee et al. | 705/10 |
| 2008/0313595 A1* | 12/2008 | Boulineau et al. | 717/101 |
| 2008/0313596 A1* | 12/2008 | Kreamer et al. | 717/101 |
| 2009/0083304 A1* | 3/2009 | Dornbach et al. | 707/102 |
| 2009/0113427 A1* | 4/2009 | Brady et al. | 718/100 |

OTHER PUBLICATIONS

Harigopal; Cognizant Enterprise Maturity Model (CEMM); vol. 31, No. 4, Nov. 2001.*

Jawahir, I. S., et al. "Total life-cycle considerations in product design for sustainability: A framework for comprehensive evaluation." Proc. 10th Int. Research/Expert Conf.(TMT 2006), Barcelona, Spain. 2006.*

A.D. Jayal, F. Badurdeen, O.W. Dillon Jr., I.S. Jawahir, Sustainable manufacturing: Modeling and optimization challenges at the product, process and system levels, CIRP Journal of Manufacturing Science and Technology, vol. 2, Issue 3, 2010, pp. 144-152, ISSN 1755-5817.*

Dillenburg, Stephen, Timothy Greene, and O. Homer Erekson. "Approaching socially responsible investment with a comprehensive ratings scheme: total social impact." Journal of Business Ethics 43.3 (2003): 167-177.*

Francis J Connelly, & George Daignault. (1974). The life cycle concept as a long term forecasting model. Academy of Marketing Science. Journal (pre-1986), 2(3), 455.*

Scott Stratman. (Nov. 2000). All stocked up. Industrial Distribution, 89(11), 92-96.*

Marshall Fisher, & Kumar Rajaram. (2000). Accurate retail testing of fashion merchandise: Methodology and application. Marketing Science, 19(3), 266-278.*

Kurawarwala, A. A., & Matsuo, H. (1996). Forecasting and inventory management of short life-cycle.. Operations Research, 44(1), 131.*

Jaikumar Vijayan. (Jul. 2001). IBM service follows products after delivery. Computerworld, 35(28), 14.*

Schepers et al. "A lifecycle approach to SOA governance" (2008) SAC '08 Proceedings of the 2008 ACM symposium on Applied computing.*

"Building SOA Solutions and Managing the Service Lifecycle" (May-Sep. 2007); Presented by IBM developerWorks.*

Varadan, R., Channabasavaiah, K., Simpson, S., Holley, K., & Allam, A.. (2008). Increasing business flexibility and SOA adoption through effective SOA governance. IBM Systems Journal, 47(3), 473-488.*

Konrad Saur. (Dec. 2003). Life Cycle Management as a Business Strategy for Sustainability. Environmental Progress, 22(4), 237-240.*

Jennifer Cannell. (Apr. 2006). Utilizing Dashboards for Performance Management. Credit & Financial Management Review, 12(2), 33-40.*

A PLM Whitepaper, prepared by ENOVIA MatrixOne, "Gaining Competitive Advantage Through Design for Environmental Compliance", 12 pages.

Aberdeen Group, "The Product Porfolio Management Benchmark Report: Achieving Maximum Product Value", Aug. 2006, 35 pages.

CoCreate Software, "CoCreate 3G PLM: Achieving lean product development", 9 pages, Copyright 2006.

Jobscope, "Engineering", 6 pages.

Sopheon, "Portfolio Management: Select the Right Products, and Bring Them to Market at the Right Time", Copyright 2008.

* cited by examiner

SYSTEM AND METHOD FOR CUSTOMIZING PRODUCT LIFECYCLE MANAGEMENT PROCESS TO IMPROVE PRODUCT EFFECTIVENESS

BACKGROUND OF THE INVENTION

The present invention relates to a customized Product Lifecycle Management (PLM) to improve the efficacy of products in an organization. More particularly, the present invention provides a system and method for customizing a PLM to improve product effectiveness of a New Product Development (NPD) process.

New Product Development (NPD) is a process of bringing a new product or service to market and is considered to be the first stage of a Product Lifecycle Management (PLM) process of an organization. Organizations use Product Lifecycle Management (PLM) packages for managing their New Product Development (NPD) process. Various PLM packages and third party Commercial-Of-The-Shelf (COTS) solutions exist in the market such as eMatrix, Enovia, Teamcenter, Windchill, SAP-PLM, and Agile PLM.

Organizations need to invest on an ongoing basis in NPD programs to improve profitability and market share through new products. Considerable investments are being made in engineering initiatives and systems such as PLM, Manufacturing Process Management (MPM), and Manufacturing Execution Systems (MES). However, product launch dates, development budgets and quality targets of above-mentioned programs are frequently missed due to design challenges, accelerated lifecycles, and complex supply chains. Studies have shown that over 80% of NPD programs fail at some level, thus resulting in product ineffectiveness in the organization.

NPD program failure occurs due to several reasons. Existing PLM packages do not provide a means to align engineering initiatives with organizational growth strategies through diagnostic assessment of NPD processes. In addition, PLM packages do not effectively integrate various product functions in a feedback loop to orchestrate product development. Also, PLM package solutions do not facilitate late changes in product design based on field performance aspect of new products released. Further, dynamic NPD go/kill/hold decisions are not taken based on Net Present Value (NPV) of product portfolio computed over the latest product cost or warranty cost.

Further, there is lack of an evaluation criteria attached to NPD stage-gate process to qualify new product ideas or specification changes for business feasibility. Customer needs are not effectively linked to NPD evaluation process and their requirements are not tracked for fulfillment. Organizations lack the ability to manage change through a responsive supply chain to provide control, visibility and predictability to product managers. Furthermore, existing PLM and COTS packages do not provide a holistic view into aspects such as eco-compliance needs and complex program synchronization. To summarize, disparate business processes, tools and practices across business units, lack of global engineering standardization, incomplete visibility, rework, reactive quality management and inefficient cost control results in failure of NPD programs despite heavy investments in PLM technologies and their customizations.

In light of the abovementioned disadvantages, there is a need for directional PLM solution based on diagnostic assessment to address product effectiveness challenge through an integrated and closed loop, cross-functional approach. Further, the PLM solution should manage the product effectively, linking each product function like customer needs, product portfolio planning, NPD program, and field performance management with a collaborative information backbone. The PLM solution should increase product value, reduce time-to-market, reduce product and operations costs, improve product reliability and increase customer satisfaction. In addition, the PLM solution should improve the efficacy of the NPD process and drive overall product effectiveness.

BRIEF SUMMARY OF THE INVENTION

A method for improving product effectiveness of a New Product Development (NPD) process by customizing a Product Lifecycle Management (PLM) of an organization is provided. The method comprises firstly diagnosing current status of the organization with respect to one or more product effectiveness parameters. The step of diagnosing the current status of the organization comprises facilitating one or more users to access a set of questionnaires, the set of questionnaires comprising questions on one or more product effectiveness parameters, receiving responses to the set of questionnaires from one or more users, allocating maturity scores to each product effectiveness parameter based on the responses to the set of questionnaires, computing a Product Effectiveness Index (PEI) based on the maturity scores, and mapping the maturity scores to step charts, the step charts providing a capability assessment of the organization with respect to the maturity scores. Secondly, generating a set of initiatives for the organization based on the diagnosis. Next, customizing the PLM using one or more solution accelerators corresponding to one or more initiatives.

In an embodiment of the present invention, product effectiveness parameter may comprise customer needs management, NPD program management, portfolio planning, NPD innovation management, NPD knowledge management, or field performance management.

In an embodiment of the present invention, the set of initiatives comprise at least one of the following: process harmonization, system engineering robustness, integrated requirement tracking, set-based concurrent engineering, product portfolio planning, green compliance, NPD product knowledge management, NPD process knowledge management, portfolio and business knowledge management, and design automation.

In an embodiment of the present invention, a solution accelerator is a tool for providing additional features to the PLM. In another embodiment of the present invention, the solution accelerator may be one of the following: a process harmonizer, an integrated requirements tracker, a product portfolio decision engine, a system engineering robustness builder, a set-based concurrent engineering enabler or a green compliance enabler.

In an embodiment of the present invention, the method further comprises customizing the PLM using one or more knowledge enablers corresponding to one or more initiatives. In another embodiment of the present invention, the one or more knowledge enablers facilitate knowledge management in the organization. In yet another embodiment of the present invention, a knowledge enabler may be one of the following: product knowledge repository, process knowledge repository, portfolio and business knowledge repository or Knowledge Based Engineering (KBE) repository.

A system for improving product effectiveness of a New Product Development (NPD) process by customizing a Product Lifecycle Management (PLM) of an organization is provided. The system comprises an NPD diagnostic module configured to diagnose current status of the organization with respect to one or more product effectiveness parameters and generate a set of initiatives based on the diagnosis. The system further comprises an Advanced Collaborative Product Management Module configured to customize the PLM using one or more solution accelerators corresponding to one or more initiatives. The system furthermore comprises an NPD knowledge management module configured to customize the PLM using one or more knowledge enablers corresponding to one or more initiatives.

In an embodiment of the present invention, the NPD diagnostic module comprises a questionnaire module configured to facilitate one or more users to access a set of questionnaires and receive responses to the set of questionnaires from one or more users, the set of questionnaires comprising questions on one or more product effectiveness parameters. The NPD diagnostic module further comprises an assessment module configured to allocate maturity scores to each product effectiveness parameter based on responses to the set of questionnaires, compute a Product Effectiveness Index (PEI) based on the maturity scores, and map the maturity scores to step charts, the step charts providing capability assessment of the organization with respect to the maturity scores. The NPD diagnostic module furthermore comprises a reporting module configured to generate reports, the reports comprising the set of initiatives, the PEI and the step charts.

In an embodiment of the present invention, user may be one of the following: stakeholder, product manager, program manager, field support team, failure analysis group, portfolio manager, process engineering lead, design lead and market research lead.

In an embodiment of the present invention, the Advanced collaborative product management module comprises a Process harmonizer configured to develop templates and stage-gate criteria to build common product development approach across one or more teams, an Integrated requirements tracker configured to capture and address comprehensive product and customer requirements across product lifecycle stages, a Product portfolio decision engine configured to enable dynamic product portfolio planning in the organization, a Systems engineering robustness builder configured to build engineering foundation to develop reliable products through integrated teamwork across multi-disciplinary teams, a Set-based concurrent engineering enabler configured to provide one or more design alternatives for optimal product configuration, and a Green compliance enabler configured to fulfill eco-compliance requirements of the NPD process.

In an embodiment of the present invention, the product portfolio decision engine performs at least one of the following functions: project prioritization, strategic segmentation, product mix allocation, risk assessment, sensitivity analytics, portfolio optimization, and Portfolio NPV evaluation.

In an embodiment of the present invention, the NPD knowledge management module comprises a product knowledge repository configured to capture and organize product data in the organization, a process knowledge repository configured to capture and organize process data in the organization, a portfolio and business knowledge repository configured to capture and organize product portfolio and business knowledge in the organization, and a Knowledge Based Engineering (KBE) repository configured to build design automation programs for ensuring design consistency in the organization.

BRIEF DESCRIPTION OF THE DRAWINGS

The present invention is described by way of embodiments illustrated in the accompanying drawings wherein.

DETAILED DESCRIPTION

A system and method for improving product effectiveness of a New Product Development (NPD) process in an organization by customizing a Product Lifecycle Management (PLM) process are described herein. The current status of the organization is diagnosed with respect to a set of product effectiveness parameters such as customer needs management, NPD program management, portfolio planning, NPD innovation management, NPD knowledge management, and field performance planning. A set of initiatives is generated based on the diagnosis, and the PLM is customized using solution accelerators and knowledge enablers corresponding to the initiatives. The method of the invention may be provided on a computer readable medium.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that are known in the technical fields related to the invention have not been described in detail so as not to unnecessarily obscure the present invention.

The present invention would now be discussed in context of embodiments as illustrated in the accompanying drawings.

Figure 1:
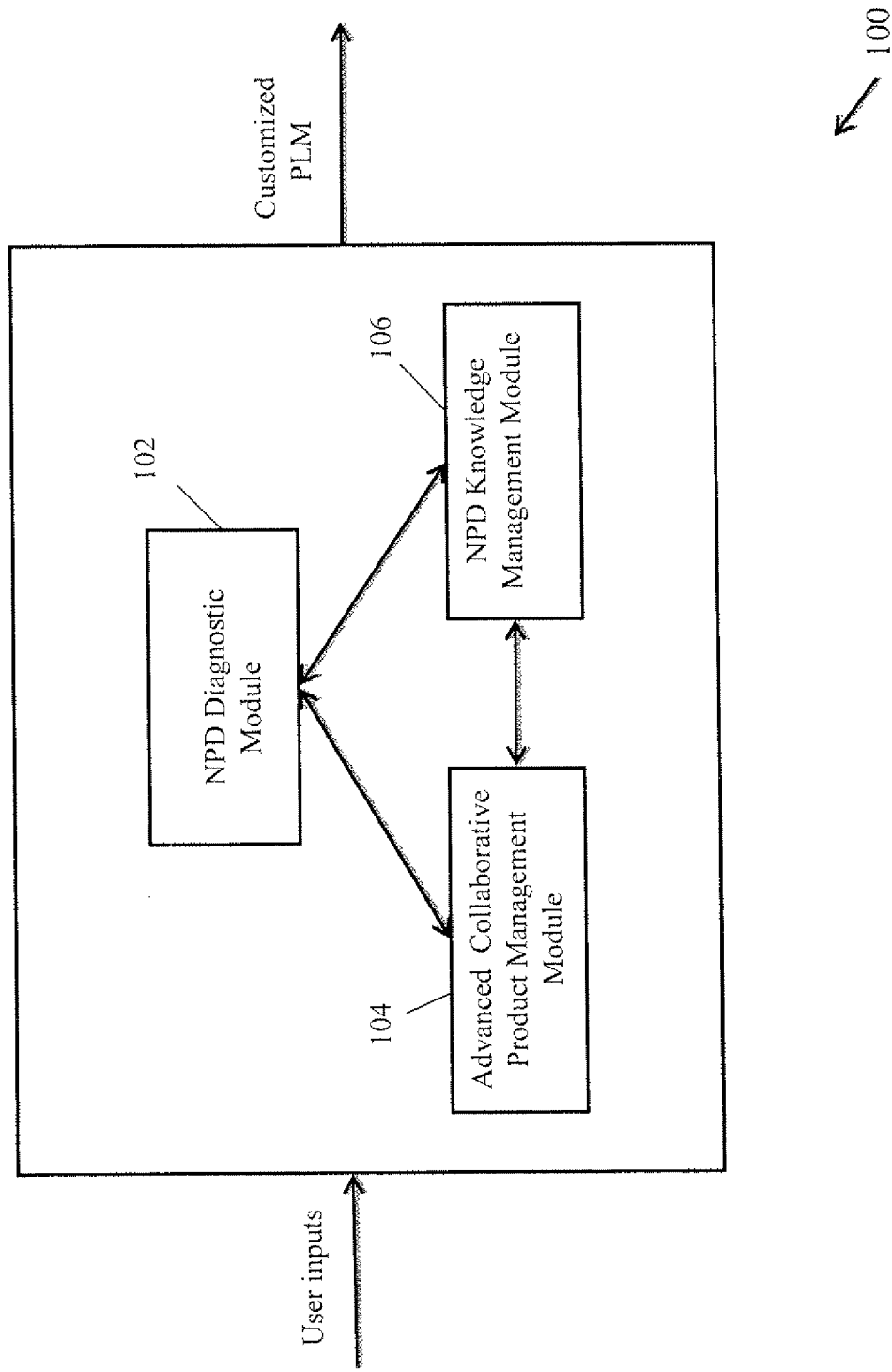
FIG. 1 illustrates a system for improving product effectiveness of an NPD process by customizing the Product Lifecycle Management (PLM) process of an organization.

FIG. 1 illustrates a system 100 for improving product effectiveness of a New Product Development (NPD) process by customizing an existing Product Lifecycle Management (PLM) process of an organization. In an organization, PLM is a process of managing lifecycle of a product from its conception, to design, to manufacture, to service, and disposal. NPD is the first stage of PLM and is a process of bringing a new product or service into the market. Examples of commercially available PLM software packages include, but are not limited to, eMatrix PLM, Enovia, Siemens PLM Teamcenter, Windchill, SAP-PLM, and Agile PLM.

System 100 provides an integrated cross-functional approach for leveraging and customizing a PLM for improving NPD process efficiency. In an embodiment of the present invention, system 100 takes input from users and provides a customized PLM solution. In another embodiment of the present invention, system 100 facilitates dynamic linking of product functions such as customer needs management, New Product Development (NPD) program management, product portfolio planning, NPD innovation management, NPD knowledge management, and field performance planning. In various embodiments of the present invention, system 100 may be implemented in multiple industry segments such as discrete manufacturing, automotive, aerospace, telecom, semiconductor, and consumer electronics. Further, system 100 may be extended to products where hardware is managed in conjunction with software lifecycle.

System 100 comprises a New Product Development (NPD) diagnostic module 102, an Advanced Collaborative Product Management module 104, and an NPD Knowledge Management module 106.

NPD diagnostic module 102 facilitates diagnosis and assessment of current status of an organization with respect to product effectiveness parameters. NPD diagnostic module 102 facilitates addressing of fundamental issues that lead to overall product ineffectiveness in an NPD process. In an embodiment of the present invention, NPD diagnostic module 102 may conduct maturity profiling of the organization with respect to multiple product effectiveness parameters. In another embodiment of the present invention, NPD diagnostic module 102 may generate a set of initiatives based on the diagnosis. Examples of initiatives include, but are not limited to, process harmonization, system engineering robustness, integrated requirement tracking, set-based concurrent engineering, product portfolio planning, green compliance, NPD product knowledge management, NPD process knowledge management, portfolio and business knowledge management, and design automation.

Advanced Collaborative Product Management module 104 customizes a PLM using one or more solution accelerators corresponding to one or more initiatives generated by NPD diagnostic module 102. In an embodiment of the present invention, a solution accelerator is a tool/interface that can customize a PLM by providing additional features to the PLM. In another embodiment of the present invention, a solution accelerator may illustrate a concept or process using a package, software, database, or tool. In yet another embodiment of the present invention, a solution accelerator focuses on a specific aspect of product effectiveness. In yet another embodiment of the present invention, a solution accelerator can accelerate an NPD process by providing necessary steps, set-up guidelines, and check-lists for deploying one or more PLM initiatives in the organization. Examples of solution accelerators include, but are not limited to, process harmonizer, product portfolio decision enabler, system engineering robustness builder, integrated requirements tracker, set-based concurrent engineering enabler, and green compliance enabler.

In various embodiments of the present invention, the solution accelerators are built using a cross-functional collaboration model that interconnects all product functions. The collaboration model for an organization is tailored for its needs and is based on a process reference model. The process reference model includes various product functions interconnected using feedback loops.

NPD knowledge management module 106 customizes a PLM using one or more knowledge enablers corresponding to one or more initiatives generated by NPD diagnostic module 102. In an embodiment of the present invention, a knowledge enabler is a tool that may be used to capture knowledge, and store information regarding products, process, and planning requirements of an NPD process. Examples of knowledge enablers include, but are not limited to, product and process knowledge repository, NPD portfolio and business knowledge repository, and Knowledge Based Engineering (KBE) repository. In an embodiment of the present invention, knowledge enabler facilitate knowledge management in the organization and a PLM customized using a knowledge enabler can accommodate late changes to product definition based on customer needs, field inputs and process changes with cost/timeline updates.

In various embodiments of the present invention, Advanced Collaborative Product Management module 104 and NPD knowledge management module 106 can be implemented in PLM systems which include partial/complete integration of PLM, Manufacturing Execution Systems (MES), and Enterprise Resource Planning (ERP).

In an exemplary embodiment of the present invention, a PLM system may comprise at least one of Document Management Systems, Computer Aided Designing (CAD) systems, Team Data Manager (TDM), and Product Data Manager (PDM) systems. The PLM system may manually provide information to an ERP system as a part of 'Engineering change effectivity' process. The engineering information may be managed within the PLM system and the ERP may be used for procurement, costing, and scheduling. In an embodiment of the present invention, Advanced Collaborative Product Management module 104 may facilitate streamlining of engineering processes and linking of all engineering data within such PLM system.

In another exemplary embodiment of the present invention, the portfolio information flow in an organization may be enabled through an automated workflow spanning PLM and ERP systems, integrated with a point-based adapter or EAI (Enterprise Application Integration) middleware. Based on requirements of the organization, batch mode or real-time integration may be established to enable swift decisions across the organization. In an embodiment of the present invention, NPD knowledge management module 106 may store pointers to locations containing latest product data so that one or more users may be given an access to download/reuse the data.

In yet another exemplary embodiment of the present invention, the integration between PLM, MES, and ERP systems in an organization enables dynamic information flow to enable fast decisions across supply chains and manufacturing plants. In an embodiment of the present invention, advanced collaborative product management module 104 facilitates business process integration across the extended enterprise with a knowledge base so as to bring scalability, performance and availability into the PLM system.

In various embodiments of the present invention, system 100 can be implemented in an organization using a combination of MS Sharepoint-Infopath (with XPath programming) and Outlook. The combination facilitates users to readily use and start deployment of business processes implemented with configurable workflows, forms and templates.

Figure 2:
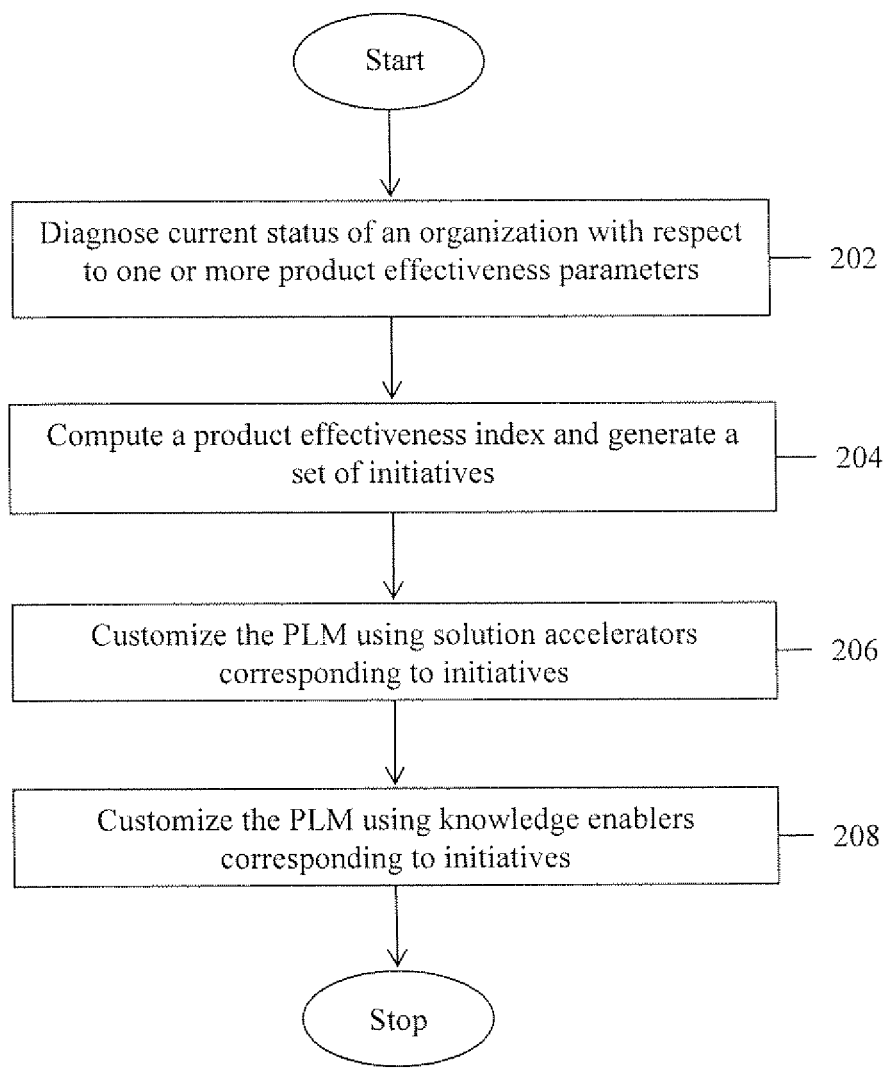
FIG. 2 is a flowchart illustrating a method for improving product effectiveness of an NPD process by customizing the PLM process of an organization.

FIG. 2 is a flowchart illustrating a method for improving product effectiveness of an NPD process by customizing a PLM of an organization. At step 202, current status of the organization is diagnosed with respect to product effectiveness parameters such as customer needs management, NPD program management, product portfolio planning, NPD innovation management, NPD knowledge management and field performance management. At step 204, a Product Effectiveness Index (PEI) is computed based on the assessment and a set of initiatives is generated. At step 206, the PLM is customized using one or more solution accelerators corresponding to one or more initiatives. At step 208, the PLM is customized using one or more knowledge enablers corresponding to one or more initiatives.

Figure 3:
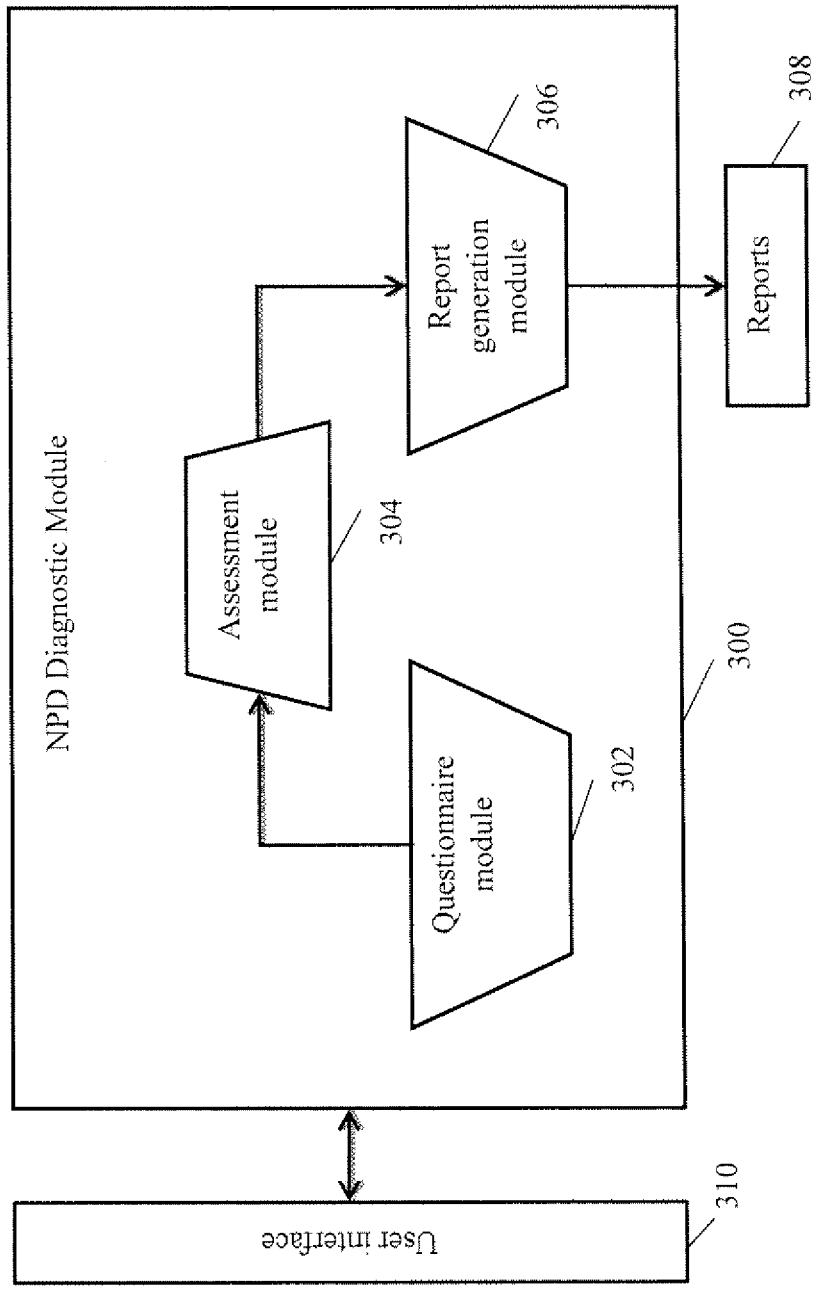
FIG. 3 illustrates a detailed New Product Development (NPD) diagnostic module of the present invention.

FIG. 3 illustrates a detailed New Product Development (NPD) diagnostic module 300 of the present invention. NPD diagnostic module 300 comprises a questionnaire module 302, an assessment module 304, and a report generation module 306. In an embodiment of the present invention, NPD diagnostic module 300 may be implemented on a .NET based platform with MS SQL Server.

NPD diagnostic module 300 is connected to a user interface 310. User interface 310 is an interface through which one or more users can access NPD diagnostic module 300. In an embodiment of the present invention, NPD diagnostic module 300 may receive various inputs from multiple users via user interface 310.

Questionnaire module 302 is configured to facilitate one or more users to access a set of questionnaires and receive responses to the set of questionnaires. The set of questionnaires comprise questions on multiple product effectiveness parameters. In an embodiment of the present invention, questionnaire module 302 is a set of Infopath Forms stored in MS Sharepoint server, however, various databases such as Oracle, SQL Server, MS Access, and FoxPro may also be used to implement the questionnaire module 302. In another embodiment of the present invention, a questionnaire on a product effectiveness parameter may comprise questions on various aspects of the corresponding product function. For example, a questionnaire on product portfolio planning parameter may comprise questions on various aspects of product portfolio function such as strategic alignment, decision making, technology enablers, adoption, performance, process, measurement, parameter, and actions. In various embodiments of the present invention, strategic alignment indicates an extent to which an existing product fits into an organization's strategy. Decision making indicates an extent to which decisions taken are timely and are facilitated by process and technology. Technology enablers signify extent of support derived from technology as part of collaboration model and adoption indicates level of acceptance of defined process across the organization. Other dimensions indicate approach to implement new processes within the organization, performance measurement and actions taken to ensure success.

In an embodiment of the present invention, the questionnaires may be provided to users in either MS InfoPath forms or MS Excel format. In another embodiment of the present invention, the access to the questionnaires is provided to those users in the organization, who are related to product development strategies, product needs, planning and performance. In an exemplary embodiment of the present invention, the access is provided to users such as stakeholders, product managers, program managers, Quality Assurance (QA) team, field support team, failure analysis group, portfolio manager, process engineering lead, design lead, and market research lead.

Assessment module 304 is configured to allocate maturity scores to the product effectiveness parameters based on the responses to the questionnaires. In an embodiment of the present invention, assessment module 304 conducts maturity profiling of the organization based on responses to the questionnaires. In another embodiment of the present invention, assessment module 304 may be referred to as a maturity profiler.

In various embodiments of the present invention, the maturity scores across multiple product effectiveness parameters may be represented in the form of a Capability Maturity Model (CMM) using a spider chart. Based on maturity scores across multiple product effectiveness parameters, assessment module 304 may compute a Product Effectiveness Index (PEI). The PEI represents a composite score across multiple product functions. In an embodiment of the present invention, the PEI provides a mapping/benchmarking of the organization with respect to its overall performance. In another embodiment of the present invention, the PEI provides a measure of organizational performance and improvement opportunities.

In various embodiments of the present invention, the maturity scores across multiple product effectiveness parameters may be mapped on to step charts. The step charts may provide a capability assessment of the organization across multiple product effectiveness parameters over progressive steps. Further, assessment module 304 may conduct a gap analysis to determine an improvement map for the organization.

Assessment module 304 may also facilitate a 'Change Readiness Assessment' of the organization. 'Change Readiness Assessment' may provide information on whether the organization and the concerned function(s) are ready to take on improvement actions. The readiness may be based on various factors such as budget, resources, timelines, historic data, group priority or technology.

In various embodiments of the present invention, assessment module 304 may generate one or more initiatives based on the maturity scores, the step charts, the product effectiveness index (PEI), and the change readiness.

Report generation module 306 facilitates generation of reports 308 based on output from the assessment module 304. In various embodiments of the present invention, reports 308 may include maturity scores, spider charts, 2*2 plots, and one or more initiatives.

Figure 4:
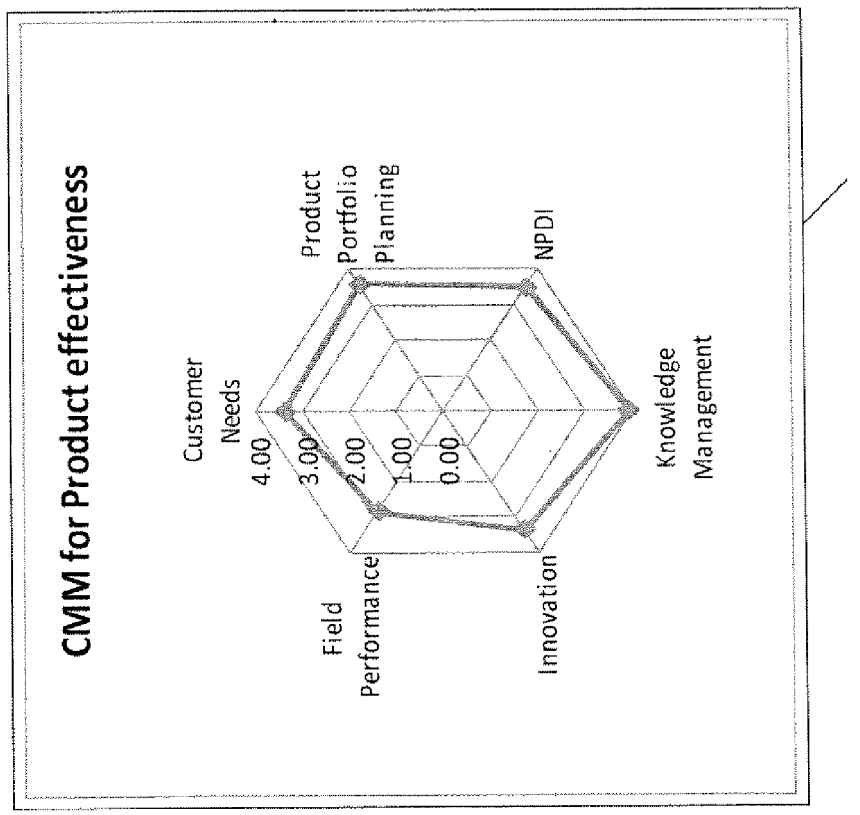
FIG. 4 illustrates a sample report generated by a report generation module.

FIG. 4 illustrates a sample report 400 generated by report generation module 306 (FIG. 3). The sample report 400 comprises a Capability Maturity Model (CMM) 402 and a table 404. In an embodiment of the present invention, CMM 402 is a spider chart which illustrates maturity profiling of an organization across product effectiveness parameters such as customer needs management, NPD program management, product portfolio planning, NPD innovation management, NPD knowledge management and field performance management. Further, table 404 is a table which illustrates maturity scores for each of the product effectiveness parameters and a PEI computed based on composite maturity score across multiple product effectiveness parameters.

Figure 5:
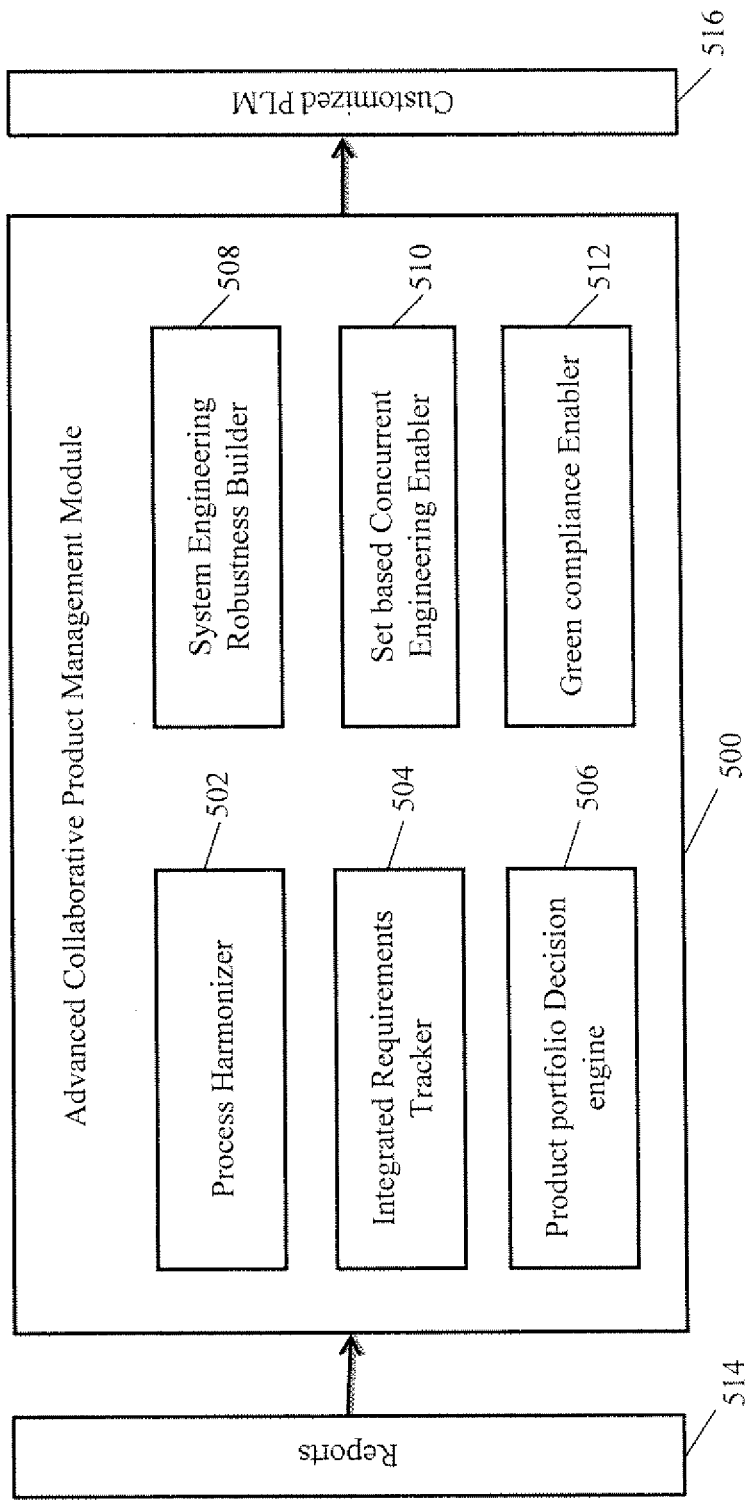
FIG. 5 illustrates a detailed Advanced Collaborative Product Management module of the present invention.

FIG. 5 illustrates a detailed Advanced Collaborative Product Management Module 500 of the present invention. Advanced Collaborative Product Management Module 500 comprises a Process harmonizer 502, an Integrated requirements tracker 504, a Portfolio decision engine 506, a System engineering robustness builder 508, a Set-based concurrent engineering enabler 510, and a Green compliance enabler 512.

Process harmonizer 502 is a solution accelerator that facilitates deployment of process harmonizing initiative in the organization. Process harmonizer 502 facilitates developing of reusable templates mapped to NPD lifecycle and stage-gate criteria to build common product development approach across one or more teams. In an embodiment of the present invention, process harmonizer 502 facilitates provision of best practices to build streamlined, scalable and global stage-gate process model for product release process and engineering change management process. In another embodiment of the present invention, process harmonizer 502 facilitates product functions like NPD program management and NPD innovation management. In yet another embodiment of the present invention, process harmonizer 502 streamlines product evaluation and qualification criteria at stage-gates of the product development process and provides operational consistency across geographies, business units and product lines.

Integrated requirements tracker 504 is a solution accelerator that facilitates deployment of integrated requirements tracking in the organization. In an embodiment of the present invention, integrated requirements tracker 504 provides techniques to capture and address comprehensive product and customer requirements across product lifecycle stages and integrate/distribute/implement/track these requirements to fulfillment. In another embodiment of the present invention, integrated requirements tracker 504 provides tools for bucketing, consolidating, prioritizing, decomposing, distributing, fulfilling, and tracking requirements across the product lifecycle. In yet another embodiment of the present invention, integrated requirements tracker 504 facilitates building of a requirement model where customer needs are linked to engineering specification. Engineering specification is linked to product design and product design is further linked to process design. A change in customer needs results in a change in product and process design. Hence, integrated requirements tracker 504 reduces late reworks and improves time-to-market by optimizing iteration cycle. In yet another embodiment of the present invention, integrated requirements tracker 504 facilitates customer needs management function.

Product portfolio decision engine 506 is a solution accelerator that facilitates deployment of product portfolio planning initiative in the organization. In an embodiment of the present invention, product portfolio decision engine 506 provides techniques to enable dynamic product portfolio planning in the organization. In another embodiment of the present invention, product portfolio decision engine 506 enables product managers to take decisions on target product cost, NPD budget and Net Present Value (NPV) of product portfolio. In yet another embodiment of the present invention, product portfolio decision engine 506 includes multiple workflows and libraries to perform at least one of the following functions: project prioritization, strategic segmentation, product mix allocation, risk assessment, sensitivity analytics, portfolio optimization, and portfolio NPV evaluation.

System Engineering Robustness Builder 508 is a solution accelerator that facilitates deployment of system engineering robustness initiative in the organization. In an embodiment of the present invention, system engineering robustness builder 508 provides techniques to build a sound engineering foundation to develop reliable products through integrated teamwork across multi-disciplinary teams. In another embodiment of the present invention, system engineering robustness builder 508 customizes the PLM to provide robust engineering building blocks for developing complex products involving multi-disciplinary teams. In yet another embodiment of the present invention, system engineering robustness builder 508 enhances product reliability, NPD agility, and customer responsiveness. In yet another embodiment of the present invention, system engineering robustness builder 508 facilitates field performance management function.

Set-based Concurrent Engineering Enabler 510 is a solution accelerator that facilitates deployment of set-based concurrent engineering initiative in the organization. In an embodiment of the present invention, set-based concurrent engineering enabler 510 provides techniques for facilitating multiple design alternatives for optimal product configuration and reduced turn around time in product development. In another embodiment of the present invention, set-based concurrent engineering enabler 510 provides best practices and templates to optimize development effort in a global engineering environment. In yet another embodiment of the present invention, set-based concurrent engineering enabler 510 facilitates NPD program management and NPD innovation management.

Green Compliance Enabler 512 is a solution accelerator that facilitates deployment of green compliance initiative in the organization. In an embodiment of the present invention, green compliance enabler 512 facilitates fulfillment of eco-compliance requirements of the NPD process. In another embodiment of the present invention, green compliance enabler 512 facilitates field performance management function.

In various embodiments of the present invention, Advanced Collaborative Product Management Module 500 receives input from reports 514. In an embodiment of the present invention, reports 514 comprise one or more initiatives generated by NPD diagnostic module 302 (FIG. 3). Based on initiatives generated in reports 514, Advanced Collaborative Product Management Module 500 provides one or more solution accelerators for customizing a PLM to obtain a customized PLM 516.

Figure 6:
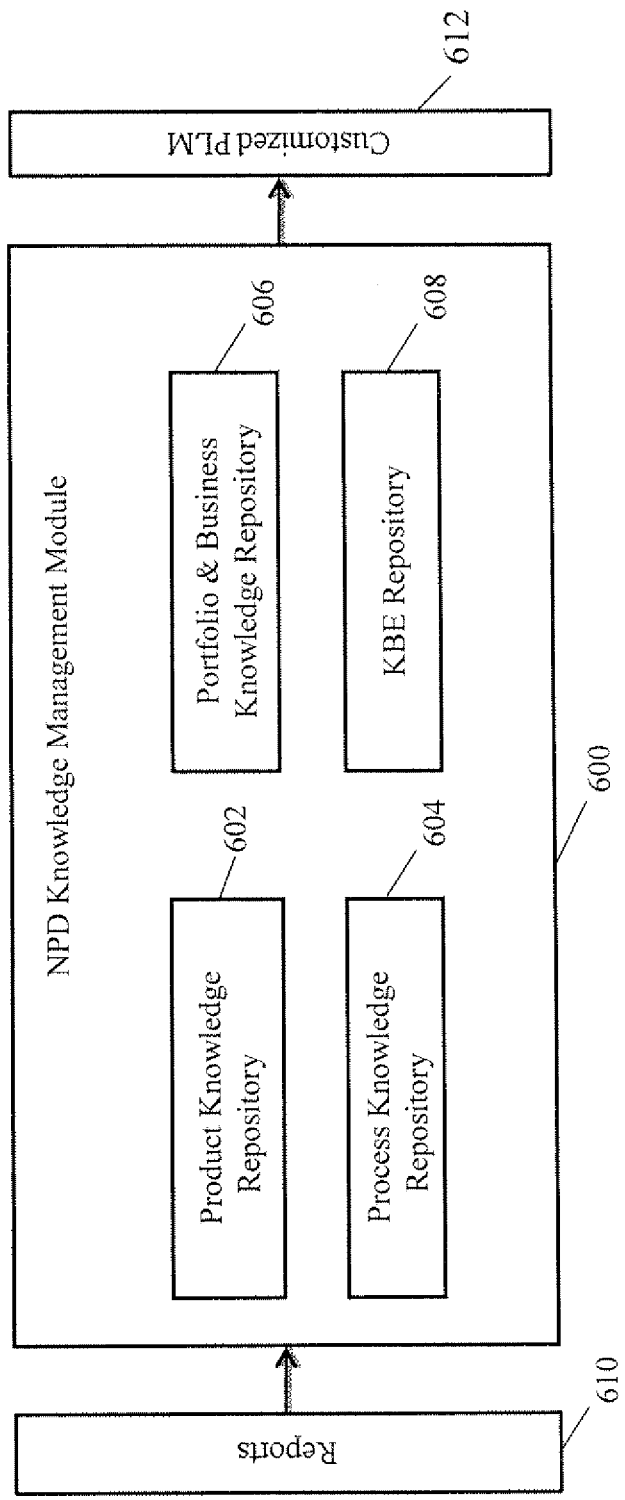
FIG. 6 illustrates a detailed NPD Knowledge Management module of the present invention.

FIG. 6 illustrates a detailed NPD knowledge management module 600 of the present invention. NPD knowledge management module 600 comprises a Product knowledge repository 602, a Process knowledge repository 604, a Portfolio and business knowledge repository 606, and a Knowledge Based Engineering (KBE) repository 608.

Product knowledge repository 602 and Process knowledge repository 604 are knowledge enablers that facilitate deployment of NPD product and process knowledge management initiatives in the organization respectively. In an embodiment of the present invention, product knowledge repository 602 and process knowledge repository 604 provide techniques to capture and organize product and process data to promote global reuse. In another embodiment of the present invention, they provide means to capture, structure, store and re-use product and process knowledge assets. In yet another embodiment of the present invention, they facilitate standardization of engineering documentation, regulations, naming conventions, tools, practices, and building of re-usable libraries. In yet another embodiment of the present invention, product knowledge repository 602 and process knowledge repository 604 facilitate NPD innovation management and NPD program management.

Portfolio and business knowledge repository 606 is a knowledge enabler that facilitates deployment of portfolio and business knowledge management initiative in the organization. In an embodiment of the present invention, portfolio and business knowledge repository 606 provides techniques to capture and organize product portfolio and business knowledge to support NPD allocation and order-processing decisions. In another embodiment of the present invention, portfolio and business knowledge repository 606 stores competitive analysis and market research information and facilitates right and timely portfolio and business decisions in the NPD process.

Knowledge Based Engineering (KBE) repository 608 is knowledge enabler that facilitates deployment of design automation initiative in the organization. In an embodiment of the present invention, KBE repository 608 provides techniques to build design automation programs to ensure design consistency, accuracy, and reduced turn-around time. In another embodiment of the present invention, KBE repository 608 facilitates design productivity and global engineering standardization in the NPD process.

In various embodiments of the present invention, NPD knowledge management module 600 receives inputs from reports 610. In an embodiment of the present invention, reports 610 comprise one or more initiatives generated by NPD diagnostic module 302 (FIG. 3). Based on initiatives generated in reports 610, NPD knowledge management module 600 customizes a PLM using one or more knowledge enablers to obtain a customized PLM 612. The customized PLM 612 facilitates global engineering standardization and knowledge reuse across the organization. The customized PLM 612 also facilitates mechanism to retrieve information on similar designs, field performance and market performance during product designing.

Figure 7:
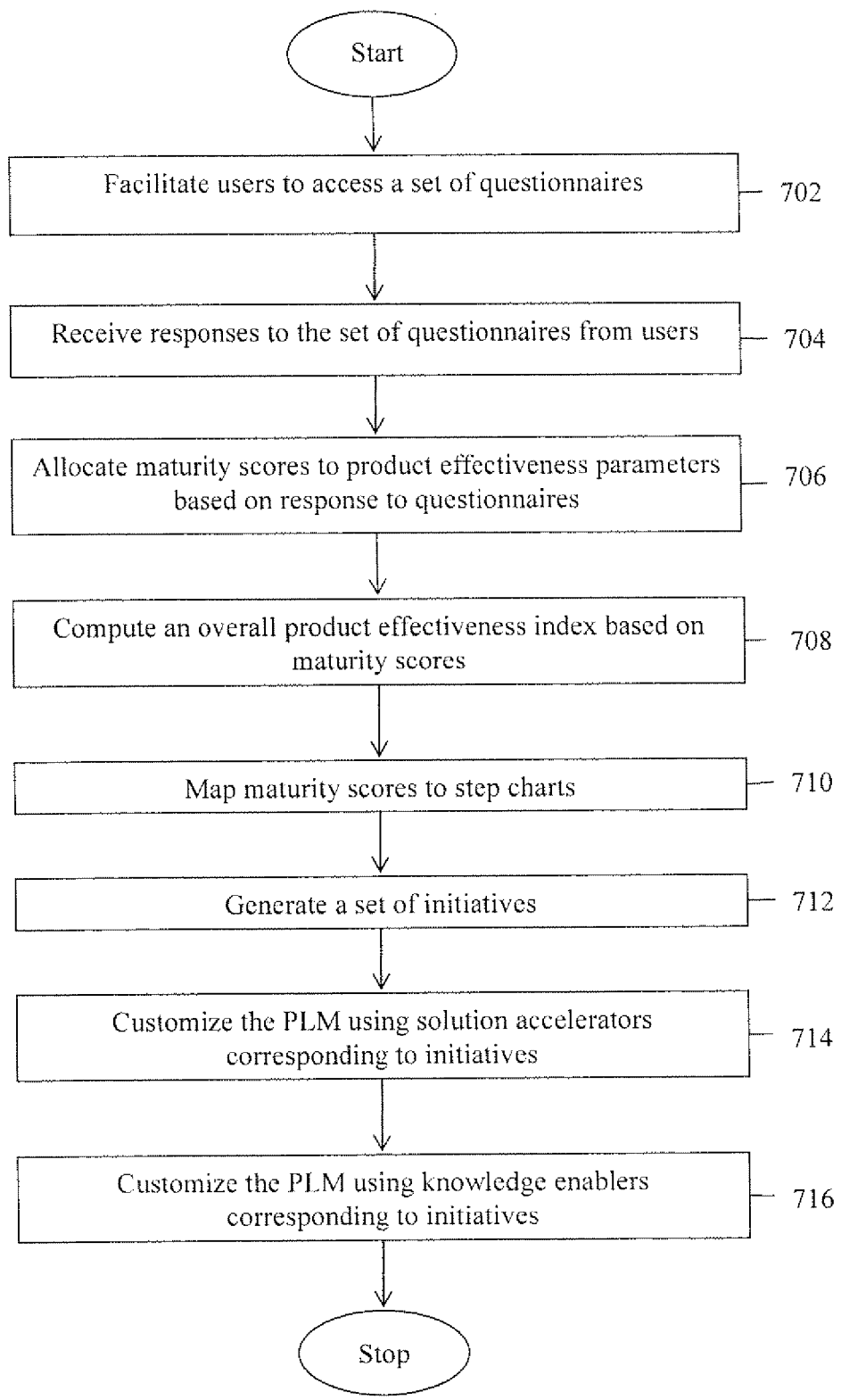
FIG. 7 is a flowchart illustrating a detailed method for improving product effectiveness of an NPD process by customizing the PLM process of an organization.

FIG. 7 is a flowchart illustrating a detailed method for improving product effectiveness of an NPD process by customizing the PLM process of an organization. At step 702, one or more users are facilitated to access a set of questionnaires. In an embodiment of the present invention, the set of questionnaires comprise questions on various product effectiveness parameters and access to questions is given to users who are related to the product development strategies, product needs, planning, program management and performance.

At step 704, one or more responses to the set of questionnaires are received from one or more users. At step 706, maturity scores are allocated to each product effectiveness parameter based on responses to the questionnaires. The maturity scores for each of the product effectiveness parameters can be represented by a Capability Maturity Model (CMM).

At step 708, a Product Effectiveness Index (PEI) of the organization is computed based on the maturity scores. At step 710, the maturity scores of each of the product effectiveness parameters are mapped to step charts. In an embodiment of the present invention, the step charts provide a capability assessment of the organization with respect to the maturity scores over progressive steps.

At step 712, a set of initiatives is generated for achieving product effectiveness in the NPD process. At step 714, the PLM is customized using one or more solution accelerators corresponding to one or more initiatives. At step 716, the PLM is customized using one or more knowledge enablers corresponding to one or more initiatives.

Figure 8:
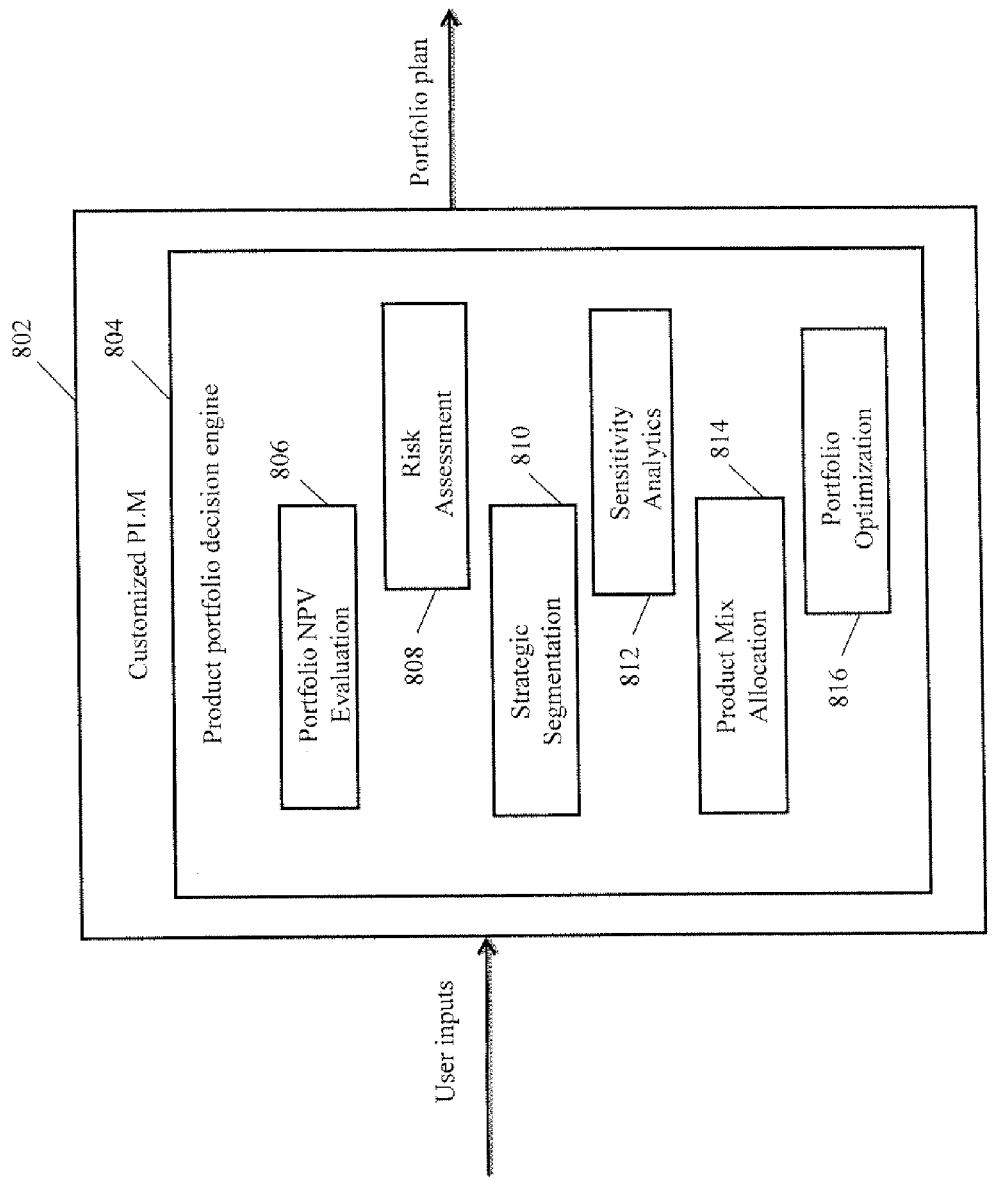
FIG. 8 illustrates a customized PLM using product portfolio decision engine of the present invention.

FIG. 8 illustrates a customized PLM 802 for facilitating efficient product portfolio planning in an organization. In various embodiments of the present invention, the customized PLM 802 is obtained by deploying a product portfolio decision engine 804 on a PLM. In an embodiment of the present invention, product portfolio decision engine 804 is a solution accelerator which provides features similar to product portfolio decision engine 506 (FIG. 5). Further, product portfolio decision engine 804 comprises tools such as Portfolio NPV Evaluation 806, Risk Assessment 808, Strategic Segmentation 810, Sensitivity analytics 812, Product mix allocation 814, and Portfolio optimization 816 for providing comprehensive approach to build and assess a product portfolio of the organization.

In various embodiments of the present invention, product portfolio decision engine 804 may take inputs/parameters from one or more users and provide a required portfolio plan. Examples of these parameters include, but are not limited to, product business case, budget, finance targets, growth strategies, business plan, product cost, program cost, competitive analysis, summary of customer needs and changes, resource and skill set availability, product family market performance history, product family field performance history, and plant/supplier capacity. The portfolio plan provided by product portfolio decision engine 804 may comprise go/kill/hold program decisions, project prioritization, focus areas for each program, updated business plan, product portfolio allocation of budget and resource and pipeline health based on NPV and standard deviation.

The present invention provides a system and method to build product effectiveness by customizing the PLM of an organization. The method and system combines diagnosis with implementation methods to build robustness in NPD process, implement dynamic decisions and ensure repeatability through knowledge management and synchronized effort by all product functions. The customized PLM enables better portfolio planning, results in superior market performance, improves product reliability, enables better customer satisfaction, facilitates global standardization, increases efficiency in product development and manufacturing, improves time-to-market, reduces cost-of-goods and reduces cost-of-operations.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

The invention claimed is:

1. A method for improving product effectiveness of a New Product Development (NPD) process by customizing a Product Lifecycle Management (PLM) of an organization via a processor configured to execute program instructions stored in a memory, the method comprising the steps of:
   diagnosing, via the processor, current status of the organization with respect to one or more product effectiveness parameters, wherein the step of diagnosing the current status of the organization comprising:
      facilitating one or more users to access a set of questionnaires, the set of questionnaires comprising questions on one or more product effectiveness parameters;
      receiving responses to the set of questionnaires from one or more users;
      allocating maturity scores to each product effectiveness parameter based on the responses to the set of questionnaires;
      computing a Product Effectiveness Index(PEI) based on the maturity scores; and
      mapping the maturity scores to step charts, the step charts providing a capability assessment of the organization with respect to the maturity scores;
   generating, via the processor, a set of initiatives for the organization based on the diagnosis; and
   customizing, via the processor, the PLM using one or more solution accelerators corresponding to one or more initiatives, wherein the step of customizing the PLM using one or more solution accelerators comprises:
      capturing comprehensive product and customer requirements during a lifecycle stage of the product lifecycle stages;
      evaluating current net product value (NPV) of the product during the lifecycle stage of the product lifecycle stages based on the captured product requirements;
      determining deviation in the current NPV based on comparison of the current NPV with a previously stored NPV for the product during the lifecycle stage of the product lifecycle stages;

determining a product portfolio plan for the product based on the determined deviation of the product, the product portfolio plan comprising one or more initiatives of modifying the content of product during the lifecycle stage of the product lifecycle stages by:
linking the customer requirements to an engineering specification, wherein the engineering specification is linked to product design associated with the PLM, and further wherein the product design is linked to process design associated with the PLM; and
modifying the product design and the process design based on the customer requirements.

2. The method of claim 1, wherein the one or more product effectiveness parameters comprise customer needs management, NPD program management, portfolio planning, NPD innovation management, NPD knowledge management, or field performance management.

3. The method of claim 1, wherein the set of initiatives comprise at least one of the following: process harmonization, system engineering robustness, integrated requirement tracking, set-based concurrent engineering, product portfolio planning, green compliance, NPD product knowledge management, NPD process knowledge management, portfolio and business knowledge management, and design automation.

4. The method of claim 1, wherein a solution accelerator is a tool for providing additional features to the PLM.

5. The method of claim 4, wherein the solution accelerator may be one of the following: a process harmonizer, an integrated requirements tracker, a product portfolio decision engine, a system engineering robustness builder, a set-based concurrent engineering enabler, or a green compliance enabler.

6. The method of claim 1 further comprising the step of customizing, via the processor, the PLM using one or more knowledge enablers corresponding to one or more initiatives.

7. The method of claim 6, wherein one or more knowledge enablers facilitate knowledge management in the organization.

8. The method of claim 6, wherein a knowledge enabler may be one of the following: product knowledge repository, process knowledge repository, portfolio and business knowledge repository, or Knowledge Based Engineering (KBE) repository.

9. A system for improving product effectiveness of a New Product Development (NPD) process by customizing a Product Lifecycle Management (PLM) of an organization, the system comprising:
an NPD diagnostic module configured to:
diagnose a current status of the organization with respect to one or more product effectiveness parameters; and
generate a set of initiatives based on the diagnosis;
an Advanced Collaborative Product Management module configured to
customize the PLM using one or more solution accelerators corresponding to one or more initiatives, wherein the PLM is customized by:
capturing comprehensive product and customer requirements during a lifecycle stage of the product lifecycle stages;
evaluating current net product value (NPV) of the product during the lifecycle stage of the product lifecycle stages based on the captured product requirements;
determining deviation in the current NPV based on comparison of the current NPV with a previously stored NPV for the product during the lifecycle stage of the product lifecycle stages;
determining a product portfolio plan for the product based on the determined deviation of the product, the product portfolio plan comprising one or more initiatives of modifying the content of product during the lifecycle stage of the product lifecycle stages by:
linking the customer requirements to an engineering specification, wherein the engineering specification is linked to product design associated with the PLM, and further wherein the product design is linked to process design associated with the PLM; and
modifying the product design and the process design based on the customer requirements
an NPD Knowledge Management module configured to:
customize the PLM using one or more knowledge enablers corresponding to one or more initiatives.

10. The system of claim 9, wherein the NPD diagnostic module comprises
a questionnaire module configured to
facilitate one or more users to access a set of questionnaires, the set of questionnaires comprising questions on one or more product effectiveness parameters; and
receive responses to the set of questionnaires from one or more users;
an assessment module configured to:
allocate maturity scores to each product effectiveness parameter based on responses to the set of questionnaires; compute a Product Effectiveness Index (PEI) based on the maturity scores; and
map the maturity scores to step charts, the step charts providing capability assessment of the organization with respect to the maturity scores; and
a reporting module configured to
generate reports, the reports comprising the set of initiatives, the PEI and the step charts.

11. The system of claim 10, wherein user may be one of the following: stakeholder, product manager, program manager, field support team, failure analysis group, portfolio manager, process engineering lead, design lead, or market research lead.

12. The system of claim 9, wherein the Advanced collaborative product management module comprises:
a Process harmonizer configured to
develop templates and stage-gate criteria to build common product development approach across teams of at least two different business units of the organization;
a Product portfolio decision engine configured to enable dynamic product portfolio planning in the organization;
a Systems engineering robustness builder configured to build engineering foundation to develop reliable products through integrated team work across multi-disciplinary teams;
a Set-based concurrent engineering enabler configured to provide one or more design alternatives for optimal product configuration; and
a Green compliance enabler configured to
fulfill eco-compliance requirements of the NPD process.

13. The system of claim 12, wherein the product portfolio decision engine performs at least one of the following functions: project prioritization, strategic segmentation, product mix allocation, risk assessment, sensitivity analytics, portfolio optimization, and Portfolio Net Present Value (NPV) evaluation.

14. The system of claim 9, wherein the NPD knowledge management module comprises:
- a product knowledge repository configured to capture and organize product data in the organization;
- a process knowledge repository configured to capture and organize process data in the organization;
- a portfolio and business knowledge repository configured to capture and organize product portfolio and business knowledge in the organization; and
- a Knowledge Based Engineering (KBE) repository configured to build design automation programs for ensuring design consistency in the organization.

15. The method of claim 1, wherein the step of customizing the PLM further comprises modifying product definition associated with the PLM based on at least one of the customer requirements, field inputs and process changes.

16. The system of claim 9, wherein the NPD Knowledge Management module is configured to customize the PLM by modifying product definition associated with the PLM based on at least one of the customer requirements, field inputs and process changes.

* * * * *